W. DREYER.
Saw-Grinding Machines.
No. 149,644. Patented April 14, 1874.
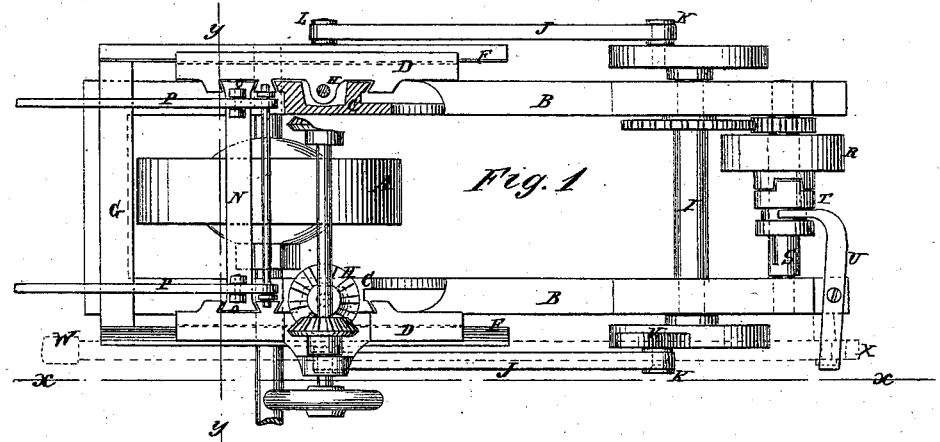
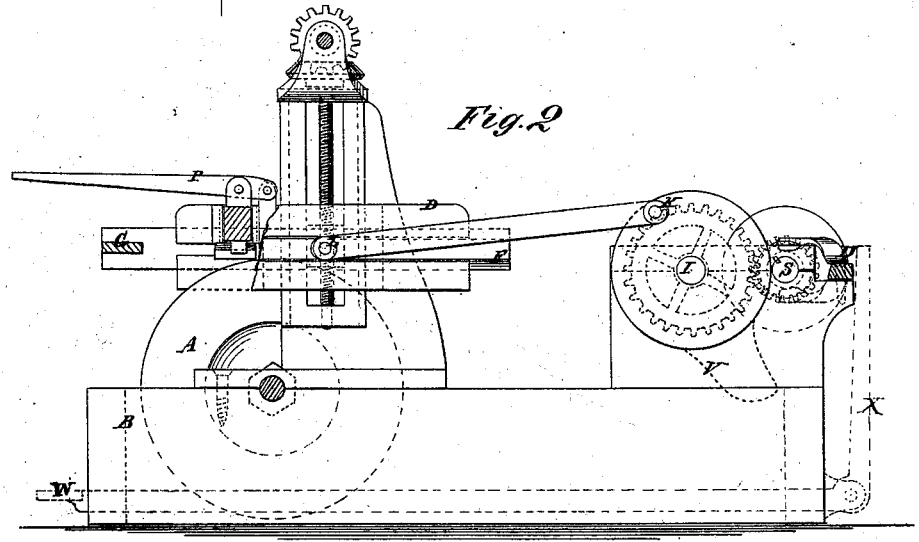
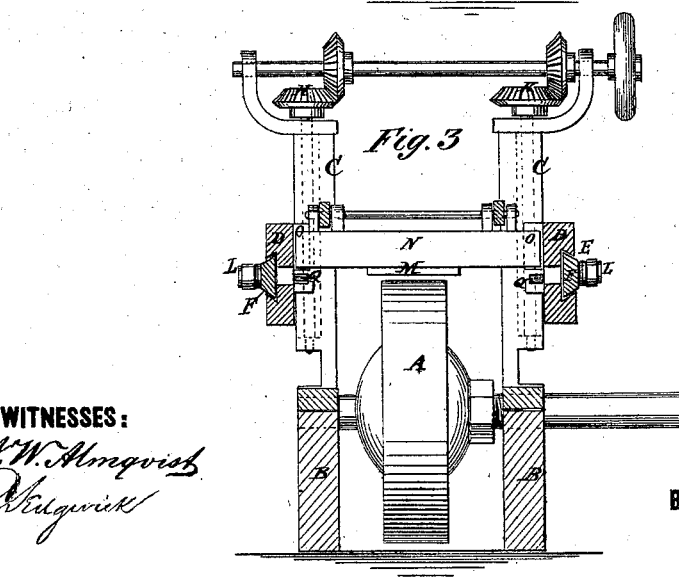
WITNESSES:
INVENTOR:
W. Dreyer
BY
ATTORNEYS.

UNITED STATES PATENT OFFICE.

WILLIAM DREYER, OF NEWARK, NEW JERSEY, ASSIGNOR TO HIMSELF AND GEORGE B. SHARP, OF NEW YORK CITY.

IMPROVEMENT IN SAW-GRINDING MACHINES.

Specification forming part of Letters Patent No. 149,644, dated April 14, 1874; application filed December 13, 1873.

*To all whom it may concern:*

Be it known that I, WILLIAM DREYER, of Newark, in the county of Essex and State of New Jersey, have invented a new and Improved Machine for Grinding Saws, &c., of which the following is a specification:

The invention will first be fully described, and then pointed out in the claim.

Figure 1 is a plan view of my improved grinding-machine. Fig. 2 is partly a side elevation, and partly a sectional elevation, and Fig. 3 is a transverse section taken on the line *y y*, Fig. 1.

A represents the stone, which is mounted in the middle of the frame B near one end, between the parts C of the housing-frame, whereon the strong blocks D, having the guide-grooves or ways E for the reciprocating frame F G, are mounted, so as to be adjusted vertically by the screws H, the said ways or guides being outside of the blocks, where the grit from the stone will not get in and cut them and the slides out to any material extent. The side pieces or slides F of the saw-carrying frame are geared to the crank-shaft I by the rods J and wrists K, in a very simple and inexpensive arrangement, whereby the reciprocating motion is obtained with considerable less cost of apparatus than in other grinding-machines.

In practice, the wrists will be adjustable on the disks or cranks, to which they are attached to change the length of the throw, and the connecting-wrists L will also be adjustable along the slides F, to change the bar G, to which the saw-plates to be ground are attached, toward or from the stone, as required for long or short saws.

M is the presser-block above the stone for pressing the saw down on it. Said block is attached to a long bar or head-block, N, fitted at the ends in vertical ways O in the blocks, to slide up and down, and it is provided with levers P for raising and lowering it. Under the ends of the block N I propose to arrange rubber or other springs, Q, for holding the block M off the stone when the saw-plate is removed, said springs being capable of springing down enough to allow the blocks to press the saw-plate on the stone as much as required. The presser-block will be made detachable for the ready application of a new one when worn out. In practice, the driving-pulley will be connected to the driving-shaft S, by a clutch, T, whose shifting-lever U will be shifted to stop the machine after each revolution, by a tappet, V, on the crank-shaft or one of its disks, and it will be shifted back by a foot-treadle, W, and elbow-lever X.

The machine is applicable for grinding any other long plates as well as saws.

Having thus described my invention, I claim as new and desire to secure by Letters Patent—

The combination, in a machine for grinding saws, with the rotary stone A, of sliding saw-frame F G, blocks D, and spring-supported blocks M N, as and for the purpose described.

WILLIAM DREYER.

Witnesses:
  A. P. THAYER,
  T. B. MOSHER.